(12) United States Patent
Rebers et al.

(10) Patent No.: US 7,078,625 B1
(45) Date of Patent: Jul. 18, 2006

(54) UNIVERSAL AERIAL HANGER

(75) Inventors: Kenneth D. Rebers, Austin, TX (US); Charles H. Dodgen, Cedar Park, TX (US); Sergio A. Alarcon, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/145,078

(22) Filed: Jun. 3, 2005

(51) Int. Cl.
*H02G 3/06* (2006.01)

(52) U.S. Cl. .................................... 174/92
(58) Field of Classification Search ............... 174/41, 174/92

See application file for complete search history.

(56) References Cited

U.S. PATENT DOCUMENTS

| | | | |
|---|---|---|---|
| 3,836,696 A | 9/1974 | Gressitt et al. | |
| 4,390,744 A | 6/1983 | Suffi et al. | |
| 4,414,426 A | 11/1983 | Burtelson | |
| 4,513,171 A | 4/1985 | Suffi et al. | |
| 4,535,197 A | 8/1985 | Butler | |
| 4,536,611 A | 8/1985 | Butler | |
| 4,605,815 A | 8/1986 | Wilson | |
| 4,647,715 A | 3/1987 | Butler | |
| 4,694,118 A | 9/1987 | Schmidt | |
| 4,810,829 A | 3/1989 | Rutenbeck et al. | |
| 4,992,627 A | 2/1991 | Mullaney | |
| 5,247,135 A | 9/1993 | Rebers et al. | |
| 6,777,617 B1 | 8/2004 | Berglund et al. | |

OTHER PUBLICATIONS

U.S. Application entitled "Telecommunications Cable Enclosure", filed Aug. 11, 2004, having U.S. Appl. No. 10/916,332.

*Primary Examiner*—Chau N. Nguyen
(74) *Attorney, Agent, or Firm*—Gregg H. Rosenblatt (57) ABSTRACT

A universal aerial hanger for supporting an aerial telecommunications device used with telecommunication lines. The hanger includes a panel, a shoulder extending from the panel, and at least one arm extending from the panel. The panel includes a mounting surface for attachment to the aerial telecommunications device and an exterior surface opposite the mounting surface. The shoulder extends from the panel toward the mounting surface and includes a plurality of latch receptors and at least one reinforced bracket mounting area.

9 Claims, 11 Drawing Sheets

UNIVERSAL AERIAL HANGER

BACKGROUND

Telecommunication cables are ubiquitous and useful for distributing all manner of data across vast networks. The telecommunication cables include electrically conductive cables (typically copper) such as twisted pair conductors and coaxial cables, although the use of fiber optic cables is growing rapidly as larger amounts of data are transmitted.

Telecommunications cables generally span, for example, from a provider source to end users, such as homes and businesses. This spanning of telecommunication cables is often termed a network. As telecommunication cables are routed across networks, it is necessary to periodically open the cable and splice or tap into the cable so that data may be distributed to "branches" of the network. The branches may be further distributed until the network reaches individual homes, businesses, offices, and so on. The distributed lines are often referred to as drop lines or distribution lines. At each point where the cable is opened, it is necessary to provide some type of closure, for example a splice closure, to protect the telecommunication lines within the cable. Preferably, the closure allows easy and repeated access to the cable, such that technicians can conveniently access the cable to provide services to the customer.

Cable terminals having a cable closure and an associated terminal box for connecting drop wires to the cable are known. Some of these terminals have a cable closure and a terminal box for connecting drop wires at the same location where a cable is opened, such as at a cable splice.

Connectivity of devices in a network relies upon the splicing and branching of the telecommunication cables in the network. Especially as relates to an existing network, various other branches may exist in an area where a present branch is contemplated. Thus, there may already be occupied splice closures and terminal boxes in the area where the present branch is desired to be located. The ability to provide additional terminal boxes adjacent existing splice closures and terminal boxes is desirable. In many instances the space allowed for such devices is limited. For example, for splice closures and terminal boxes suspended from a strand, vertical space available below the strand may be limited to distances as small as 12 inches.

With the above in mind, an aerial terminal having a terminal box that is useful in expanding new and existing telecommunication networks is desirable. In particular, an aerial terminal useful with telecommunication lines and other cable terminals that can be selectively hung alongside existing splice closures, that is strong, lightweight, easy to access, and a provides variety of sizes of terminal boxes that are compatible with fiber optic cables and electrically conductive telecommunication cables is highly desirable.

SUMMARY

One aspect of the present invention provides a universal aerial hanger for supporting an aerial telecommunications device used with telecommunication lines. In one embodiment, the universal aerial hanger includes a panel, a shoulder extending from the panel, and at least one arm extending from the panel. The panel includes a mounting surface for attachment to the aerial telecommunications device and an exterior surface opposite the mounting surface. The shoulder extends from the panel toward the mounting surface and includes a plurality of latch receptors and at least one reinforced bracket mounting area. The arm(s) extend from the exterior surface of the panel and is/are configured to receive strain relief guide loops for drop lines exiting the aerial telecommunications device.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top" bottom "front" "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
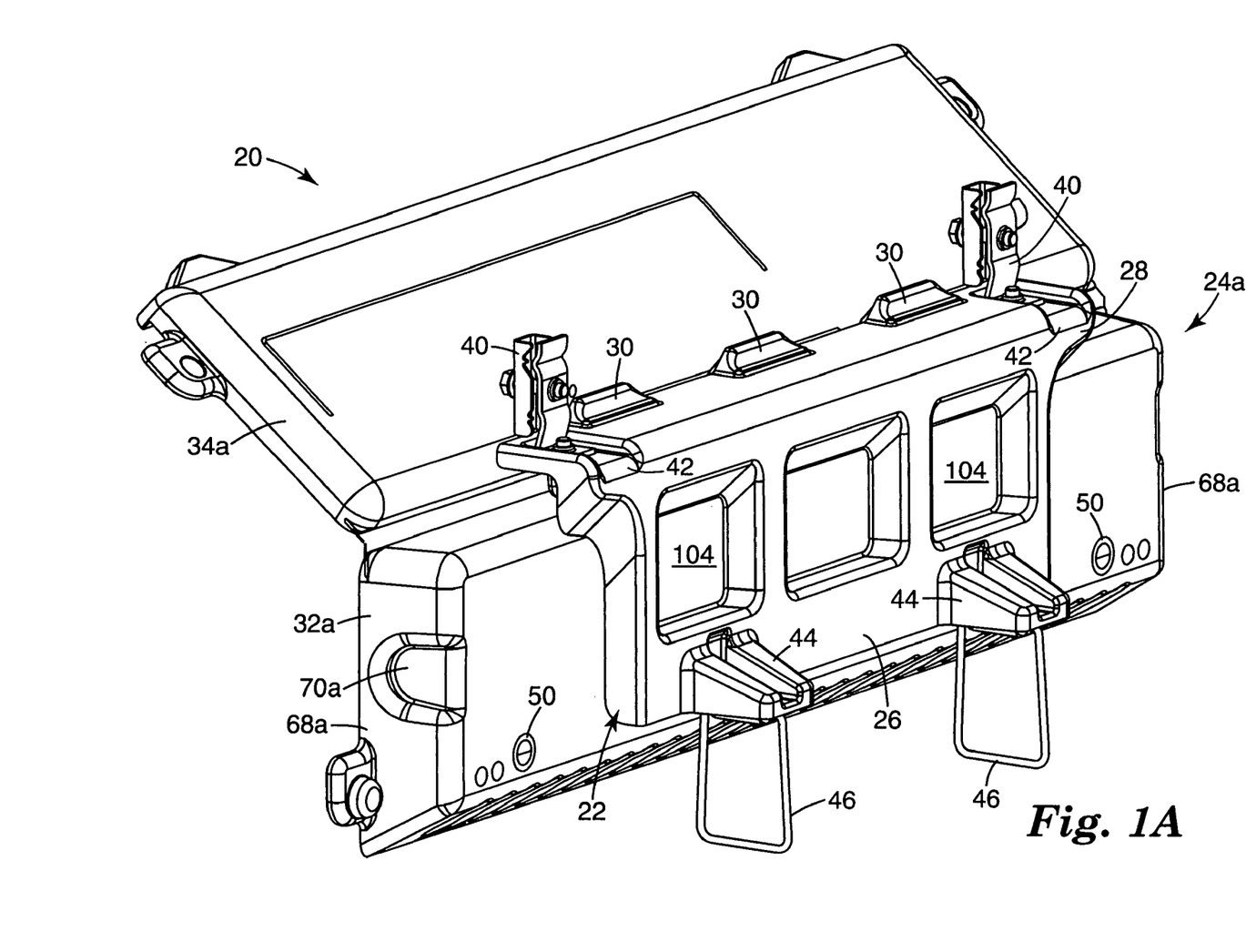
FIG. 1A illustrates a rear perspective view of an aerial terminal including a hanger and a terminal box according to one embodiment of the present invention.

FIG. 1A illustrates a rear perspective view of an aerial terminal 20 for use with telecommunication lines (not shown) according to one embodiment of the present invention. Aerial terminal 20 includes a hanger 22 and a terminal box 24a. The hanger 22 defines a panel 26 and a shoulder 28 extending from panel 26. In one embodiment, the panel 26 includes arms 44 extending therefrom, the arms 44 provided with strain relief guide loops 46 configured to support drop lines (not shown) exiting from terminal box 24a. In one embodiment, panel 26 includes at least one compressed double wall region 104, more fully described with reference to FIG. 5 below.

With regard to shoulder 28, in one embodiment shoulder 28 includes a plurality of latch receptors 30 that cooperate with the terminal box 24a in providing a hold-open mechanism useful in accessing terminal box 24a during a servicing operation. Additionally, in one embodiment, aerial terminal 20 is suspended from a strand 204 (FIG. 11), and to facilitate hanging of aerial terminal 20, bracket hangers 40 are provided and coupled to bracket mounting areas 42 defined in shoulder 28.

Terminal box 24a includes a base 32a configured for joining to panel 26 and a lid 34a. In one embodiment, lid 34a is moveably coupled or hinged to base 32a, and is moveable between one or more open positions and a closed position. Lid 34a includes at least one latch 36 (best seen in FIG. 12). Upon assembly, terminal box 24a is joined to panel 26 such that at least one of the latches 36 of lid 34a mates with at least one of the plurality of latch receptors 30 of shoulder 28 when lid 34a is in the open position (see, for example, FIG. 12). As a point of reference, and although not visible in the orientation of FIG. 1A, two latches 36 of lid 34a are coupled with an outermost two of the latch receptors 30. The number of latches 36 and latch receptors 30 used to maintain lid 34a in the open position with vary with the size and weight of lid 34a.

Base 32a of terminal box 24a further defines end walls 68a (one shown) that define a cable port 70a (i.e., a telecommunication line port). In one embodiment, each of the end walls 68a of the terminal box defines a cable port 70a, such that terminal box 24a has two cable ports 70a. As illustrated in FIG. 1A, in one embodiment cable port 70a extends over less than 50% of an area of end wall 68a. Hanger 22 is configured to permit unrestricted access to end wall 68a, and is thus is compatible with a variety of sizes of cable ports 70a, including cable ports 70a that extend over substantially an entirety of end wall 68a. In one exemplary embodiment, terminal box 24a defines a length between opposing end walls 68a of approximately 22 inches, although any the terminal box may be formed in any suitable or desired length.

Figure 1B:
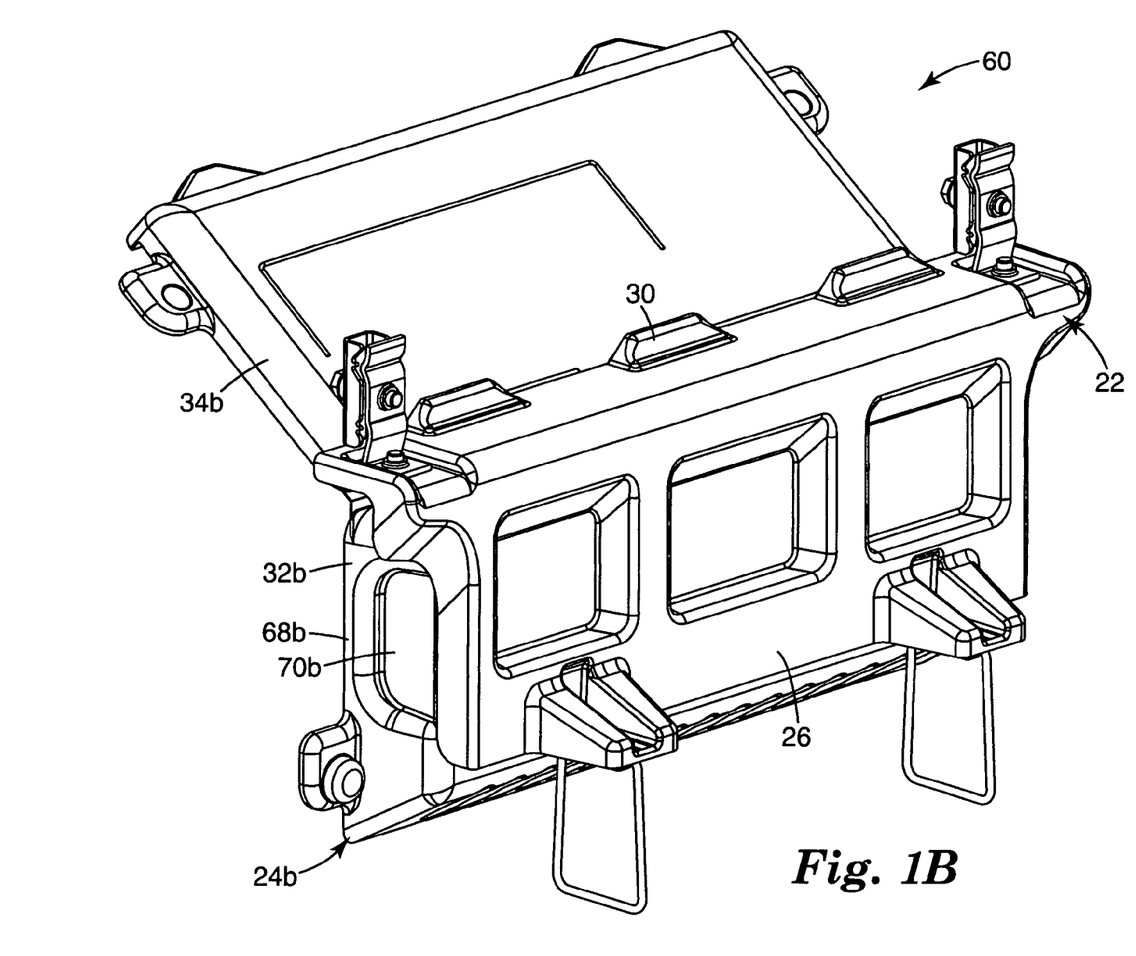
FIG. 1B illustrates a rear perspective view of an aerial terminal including a hanger and a short terminal box according to one embodiment of the present invention.

FIG. 1B illustrates a rear perspective view of an aerial terminal 60 according to another embodiment of the present invention in which the length of terminal box 24b is shorter than the length of terminal box 24a of FIG. 1A. In FIG. 1B, the length of terminal box 24b is substantially equal to the hanger 22 length. In this regard, as described with reference to the embodiment of FIG. 1A, hanger 22 couples to terminal box 24b without obstructing access to end walls 68b and associated cable port 70b. Cable port 70b in the embodiment of FIG. 1B is larger than cable port 70a in the embodiment of FIG. 1A, and comprises more than 50% of the area of end wall 68b. As a point of reference, and although not visible in the orientation of FIG. 1B, a central latch 36 of lid 34b is coupled with a centrally positioned latch receptor 30, as best and specifically illustrated in FIG. 12. In one exemplary embodiment, terminal box 24b defines a length between opposing end walls 68b of approximately 12.5 inches, although other lengths are acceptable.

Figure 1C:
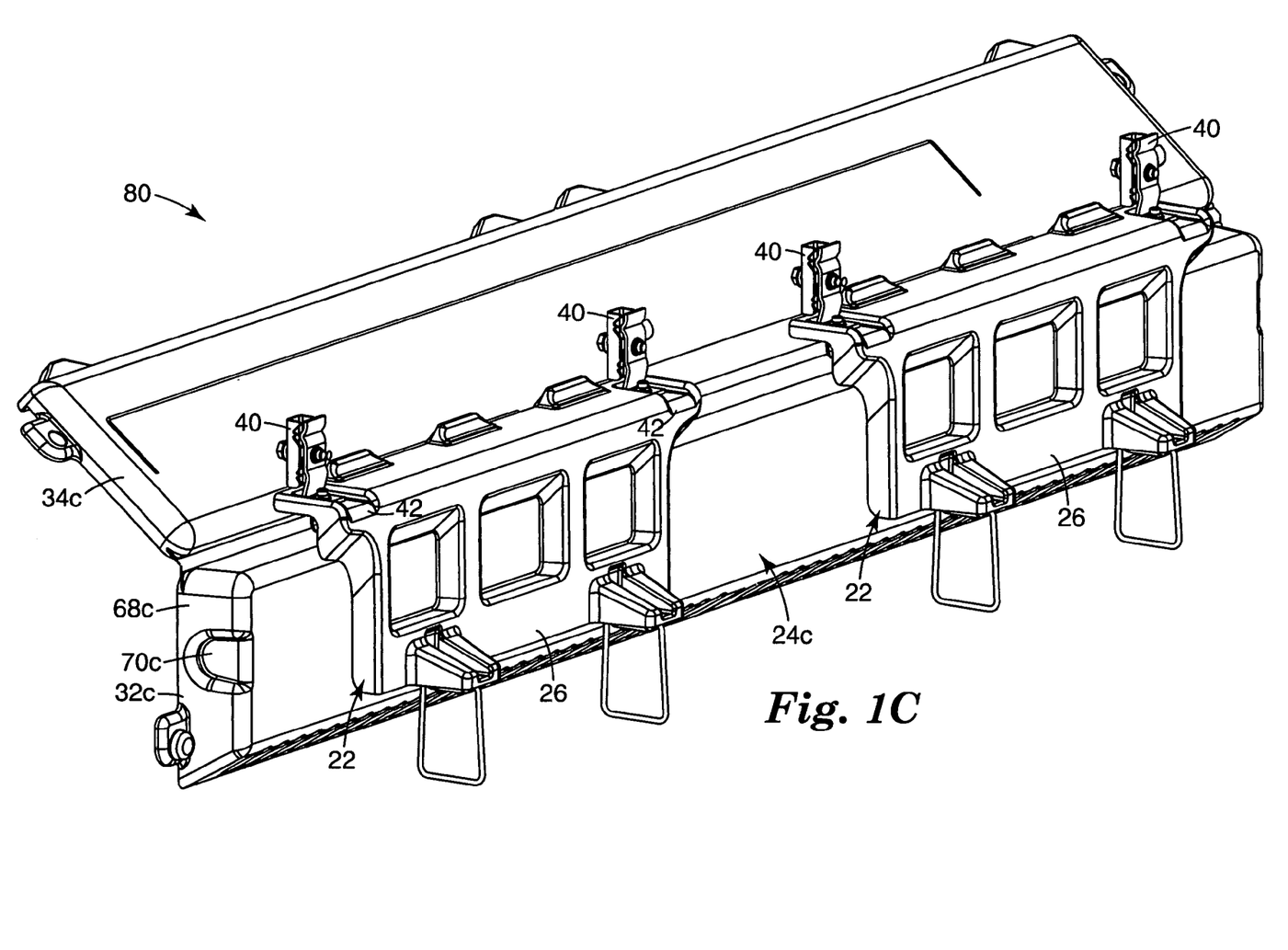
FIG. 1C illustrates a rear perspective view of an aerial terminal including two hangers coupled to a terminal box according to one embodiment of the present invention.

FIG. 1C illustrates a rear perspective view of an aerial terminal 80 according to another embodiment of the present invention in which the terminal box 24c length is substantially greater than the hanger 22 length, such that more than one hanger 22 is employed to suspend the terminal box 24c. With this in mind, terminal box 24c is highly similar to terminal box 24a described above in FIG. 1A, and base 32c and lid 34c, although "longer," are otherwise similar to base 32a and lid 34a. In one embodiment, terminal box 24c has a length greater than approximately 22 inches. Aerial terminal 80 includes a pair of hangers 22 coupled to terminal box 24c, although it is to be understood that one, two, or three or more hangers could be employed to suspend aerial terminal 80 from strand 204 (FIG. 11), depending upon a selection of a length for terminal box 24c. Multiple bracket hangers 40 are provided to support the weight of aerial terminal 80 along the strand such that aerial terminal 80 can be used with telecommunication lines suspended from the strand. As in the embodiments of FIGS. 1A and 1B, hangers 22 support terminal box 24c and provide unrestricted access to cable port 70c formed in one end wall 68c of base 32c.

The hanger 22 and terminal boxes 24a–24c (in general, and hereinafter terminal box 24) may have any desired size, as is appropriate for the intended application. In one embodiment, terminal box 24 is provided in a variety of lengths, and hanger 22 has a standard or "universal" size that may be used with more than one size of terminal box 24. A length of the terminal box 24 may be greater than the hanger 22 length (terminal box 24a of FIG. 1A, and terminal box 24c of FIG. 1C), approximately the same as the hanger 22 length (terminal box 24b of FIG. 1B), or less than the hanger 22 length. In one embodiment, hanger 22 has a length in the range of 6 inches to 18 inches. In one embodiment, the terminal box 24 has a length in the range of 6 inches to 48 inches. In other embodiments, the terminal box 24 has a length of 48 inches or greater. In one embodiment, the hanger 22 and terminal box 24 each have a height, alone and in a joined configuration, that is less than approximately 12 inches. In one embodiment, the hanger 22 has a height that is in the range of 4 inches to 6 inches.

For purposes of clarity and ease of description, and with the varying embodiments of FIGS. 1A–1C in mind, the following description will reference similarly numbered elements by their numeric portion only (in contrast to the alphanumeric identifiers employed above). For example, terminal boxes 24a–24c will be generally referred to as terminal box 24, bases 32a–32c will be generally referred to as base 32, and lids 34a–34c will be generally referred to as lid 34. However, it is to be understood that the specific terminal boxes 24a–24c described above comprise various differences, although in general, the terminal boxes share many commonalities.

Figure 2:
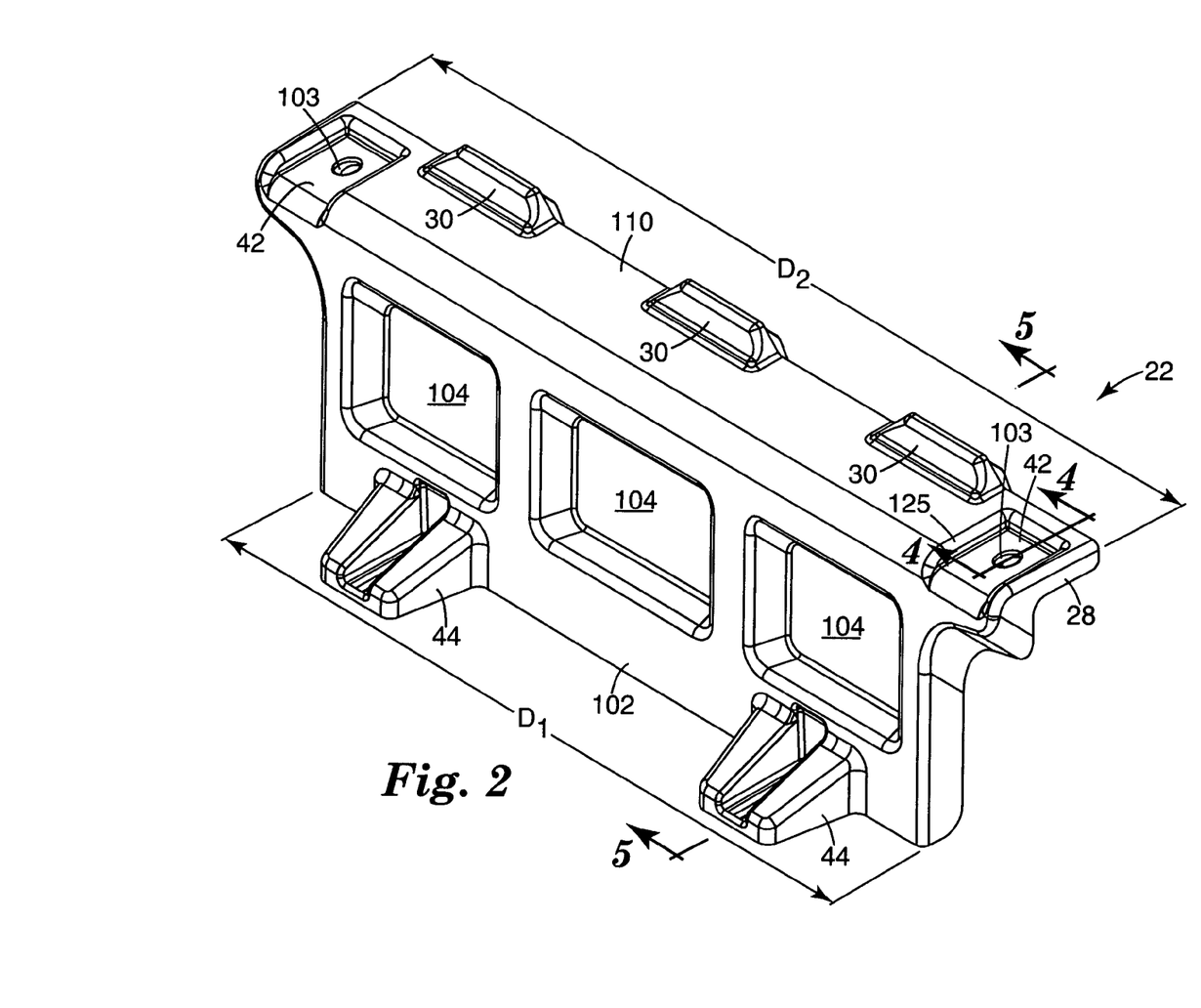
FIG. 2 illustrates a rear perspective view of an aerial hanger including a shoulder and a panel extending from the shoulder according to one embodiment of the present invention.
Figure 3:
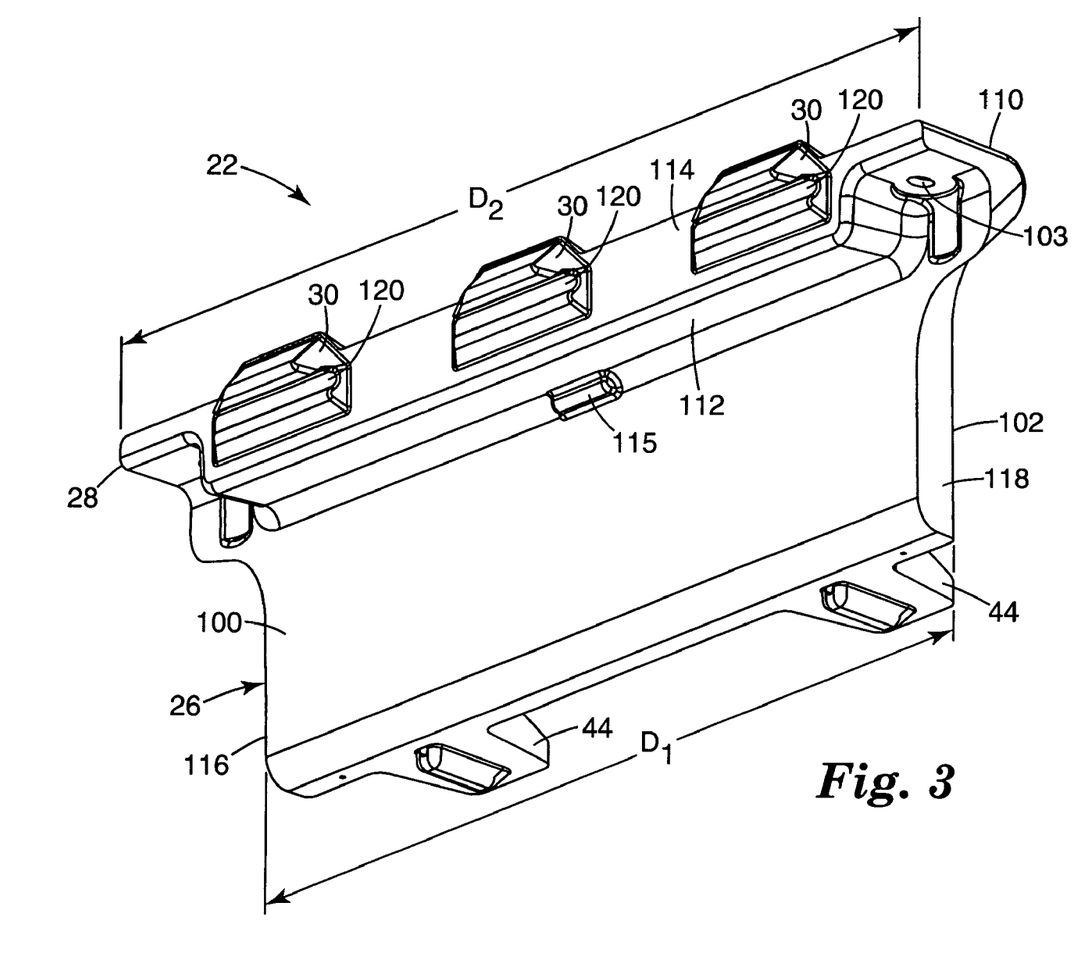
FIG. 3 illustrates a front perspective view of the aerial hanger of FIG. 2, illustrating a mounting surface of the panel according to one embodiment of the present invention.

FIGS. 2 and 3 illustrate hanger 22 prior to attachment to terminal box 24. As best seen in FIG. 3, panel 26 defines opposing ends 116, 118 along a longitudinal direction separated by distance D1. In one embodiment, shoulder 28 extends longitudinally a distance D2, where D2 is greater than D1 such that shoulder 28 extends beyond the opposing ends 116, 118 of panel 26. In another embodiment, D2 is approximately equal to D1. In one embodiment, D1 is approximately 12 inches, and D2 is approximately 14 inches. In one embodiment, shoulder 28 extends from panel 26 at approximately a right angle toward mounting surface 100. In another embodiment, shoulder 28 extends from panel 26 at a non-orthogonal angle selected to conformably receive terminal box 24.

In one embodiment, shoulder 28 defines a top surface 110 opposite a bottom surface 112, and a face 114 extending between the top surface 110 and the bottom surface 112. In this regard, bottom surface 112 is adjacent to a mounting surface 100 of panel 26. Referring now to FIG. 3, mounting surface 100 couples to base 32 of terminal box 24 when aerial terminals 20, 60, 80 are assembled. As illustrated in FIG. 3, an exterior surface 102 of panel 26 is formed opposite mounting surface 100, and arms 44 extend from exterior surface 102.

As best seen in FIG. 3, an alignment feature 115 is formed at a juncture of bottom surface 112 of shoulder 28 and mounting surface 100 of panel 26. In one, embodiment, alignment feature 115 comprises a ridge or other protrusion formed to extend from hanger 22 and engage a recess in terminal box 24 (not shown). In another embodiment, alignment feature 115 comprises a recess formed in hanger 22 to receive a protrusion formed on terminal box 24 (not shown). In any regard, alignment feature 115 aligns and correctly positions terminal box 24 relative to hanger 22 and simplifies assembly/installation of the aerial terminal. In other embodiments, alignment feature 115 is located at other locations along, and not necessarily centered, relative to mounting surface 100.

Latch receptors 30, introduced above, are seen to extend from face 114 of shoulder 28. In one embodiment, and with additional reference to FIG. 2, latch receptors 30 extend both from top surface 110 and shoulder face 114 of shoulder 28. In any regard, latch receptors 30 define a latch recess 120 configured and positioned to receive latches 36 (FIG. 12) when lid 34 is in an open position.

Figure 4:
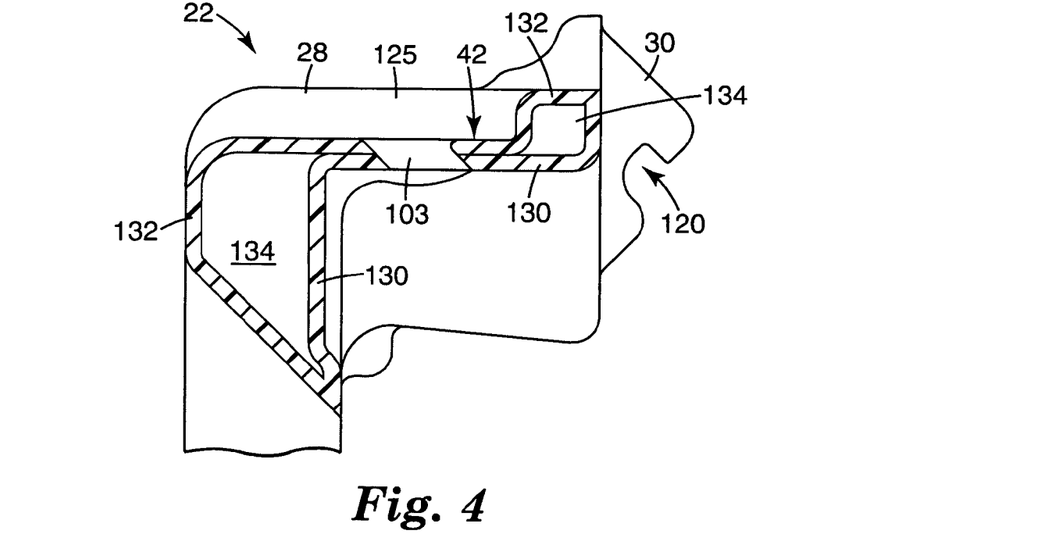
FIG. 4 illustrates a cross-sectional view of an aerial hanger taken along line 4—4 in FIG. 2, with the cross-section illustrating one embodiment of a bracket mounting area in accordance with the present invention.

FIG. 4 illustrates a cross-sectional view of aerial hanger 22 taken along line 4—4 in FIG. 2. As illustrated, reinforced bracket mounting area 42 defines a bolt hole 103, and the cross-section is taken through bolt hole 103, and thus through bracket mounting area 42. In one embodiment, panel 26 and shoulder 28 each define an interior wall 130 and an exterior wall 132 such that the hanger 22 defines a molded double wall structure defining a substantially hollow core 134. In one embodiment, exterior wall 132 is compressed and molded to interior wall 130 to form a compressed double wall region that reinforces bracket mounting area 42. In particular, shoulder 28 defines a slotted bracket mounting area 42 that includes at least one ridge 125. The slotted bracket mounting area 42, and more specifically ridge 125, prevents rotation of the hanger bracket 40 relative to the hanger 22.

In one embodiment, bolt hole 103 is skewed or angled relative to the surface of bracket mounting area 42 (i.e., bolt hole 103 is not formed perpendicular to the surface of bracket mounting area 42). Bolt hole 103 is oriented in a skewed fashion as a result of a collapsing of exterior wall 132 toward interior wall 130 simultaneously for both panel 26 and shoulder 28 of the molded double wall structure of hanger 22. In this manner, walls of the molded double wall structure of hanger 22 are collapsed in a single process step along more than one axis. For example, relative to panel 26, exterior wall 132 is collapsed toward interior wall 130 along a horizontal axis of panel 26; and relative to shoulder 28, exterior wall 132 is collapsed toward interior wall 130 along a vertical axis, thus resulting in bolt hole 103 being skewed at approximately 45 degrees relative to bracket mounting area 42.

Figure 5:
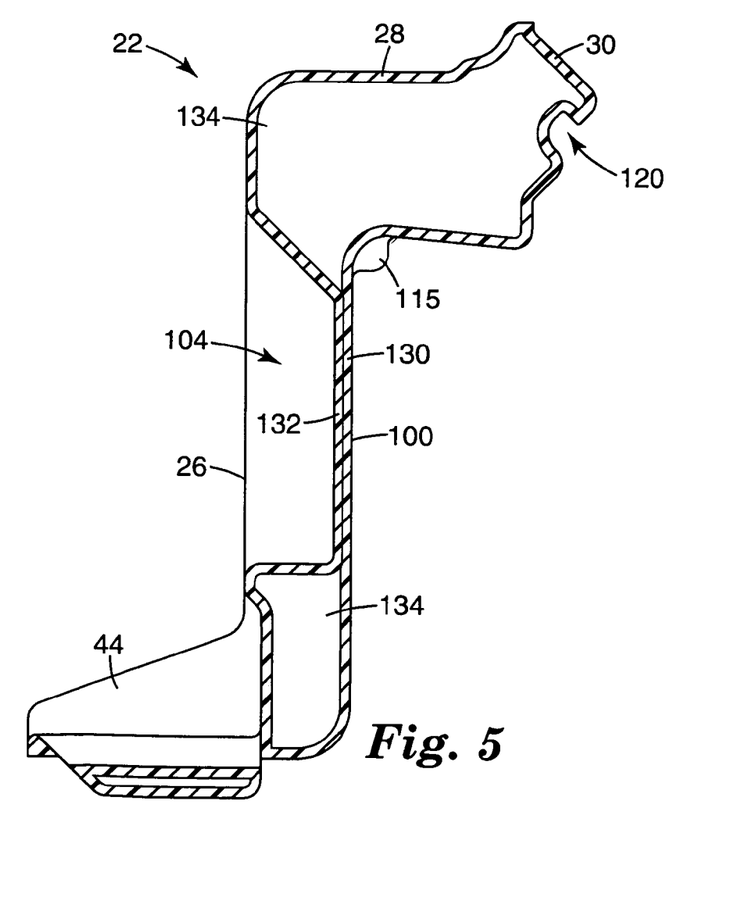
FIG. 5 illustrates a cross-sectional view of an aerial hanger taken along line 5—5 in FIG. 2, with the cross-section illustrating one embodiment of a compressed double wall region in accordance with the present invention.

FIG. 5 illustrates a cross-sectional view of hanger 22 with the cross-section taken through a central location of compressed double wall region 104 along line 5—5 of FIG. 2. As described above, hanger 22 includes a molded double wall structure defining a substantially hollow core 134. A reinforced region along panel 26 (similar to reinforced bracket mounting area 42 of FIG. 4) is formed when exterior wall 132 is compressed and joined to interior wall 130, thus forming compressed double wall region 104. In one embodiment a heated platen or mold is employed to thermoplastically deform and heat weld exterior wall 132 to interior wall 130 in a single processing step.

Compressed double wall region 104 adjacent to mounting surface 100 increases rigidity of hanger 22 in the region where terminal box 24 is coupled to hanger 22. In this manner, upon assembly, terminal box 24 is centrally aligned relative to hanger 22 via alignment feature 115 (shown as an alignment ridge), and rigidly secured against mounting surface 100, such that elements connected within terminal box 24 are protected against shifting and deformation that might otherwise occur in the absence of compressed double wall region 104.

As employed in this Detailed Description, the phrase "compressed double wall region" refers to a region of a double walled structure, such as hanger 22, that is collapsed from a substantially hollow conformation to a substantially solid conformation in that specific region, although this does not imply that the thickness of the compressed double wall region is limited to twice the thickness of any one wall defining the structure. That is to say, in some aspects of the present invention, compressed double wall regions can include one wall having a range of thickness, or a pair of walls having separate, and perhaps overlapping, ranges of thicknesses. The thickness of a compressed double wall region can be equal to the combined thicknesses of the compressed walls, or can be less than the combined thicknesses of the compressed walls if sufficient pressure is applied during the compression process.

Figure 6:
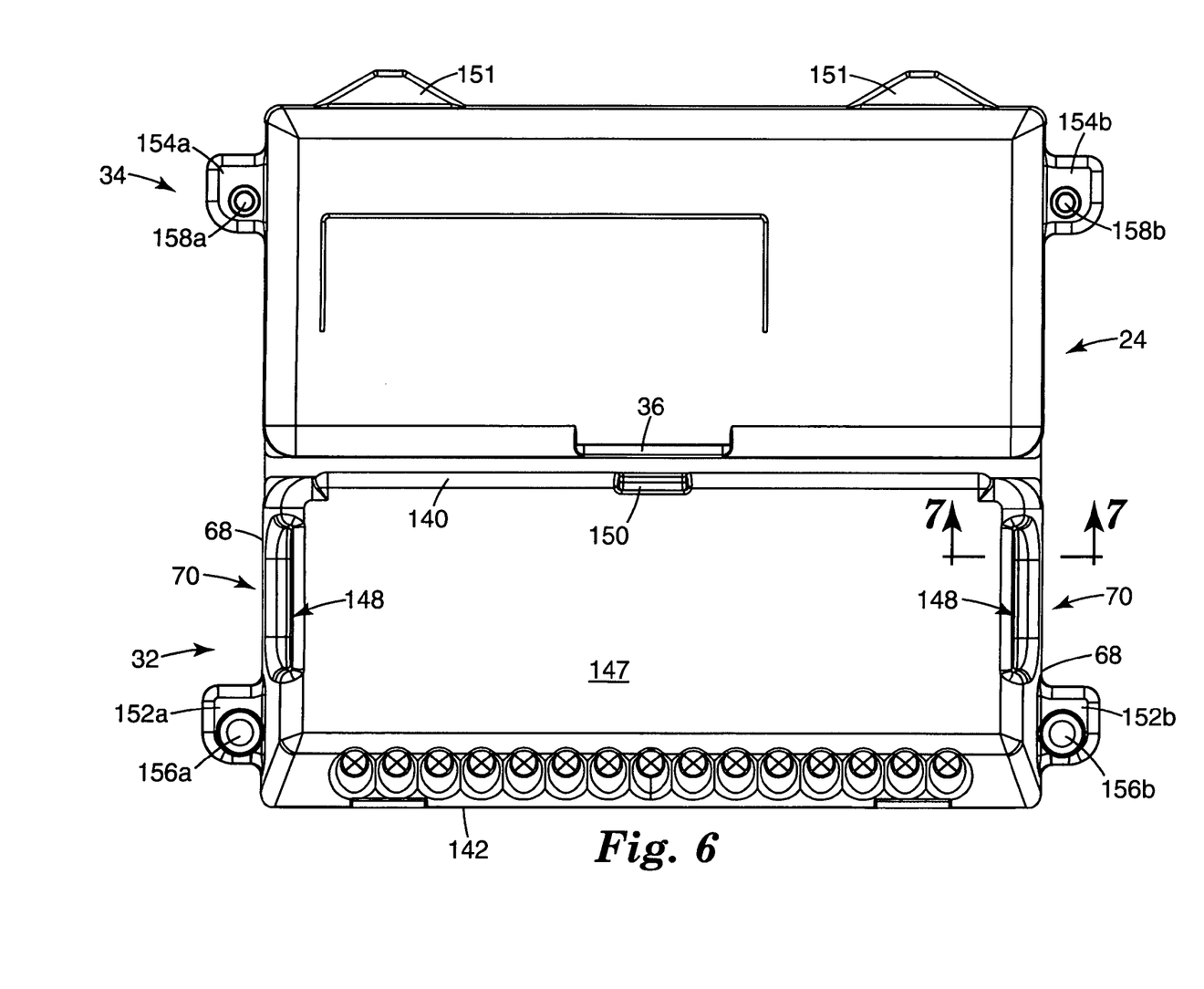
FIG. 6 illustrates a plan view of a back side of an open terminal box according to one embodiment of the present invention.

FIG. 6 illustrates a plan view of a backside of a general, open terminal box 24 useful with telecommunication lines according to one embodiment of the present invention. As a point of reference, terminal box 24 of FIG. 6 is the same terminal box illustrated in FIG. 11B, although terminal boxes 24a and 24c are similarly constructed. With the above in mind, base 32 includes a top wall 140 and a bottom wall 142, opposing end walls 68, and a back wall 147 extending between the top and bottom walls 140, 142 and end walls 68. In one embodiment, lid 34 is movably coupled to top wall 140, and a portion of at least one of the opposing end walls 68 defines a compressed double wall region 148 (discussed in greater detail below with reference to FIG. 7) forming telecommunication line port 70.

In one embodiment, and with additional reference to FIG. 1B, back wall 147 of base 32 is coupled to mounting surface 100 (FIG. 3) of panel 26, and base 32 includes an alignment feature 150 configured to align terminal box 24 with panel 26. In one embodiment, alignment feature 150 is an alignment recess formed in base 32 and adapted to receive a protruding alignment ridge 115 (FIG. 5) formed in mounting surface 100. However, it is to be understood that alignment feature 150 could alternately be an alignment ridge formed in base 32 and adapted to couple into an alignment recess formed in mounting surface 100.

Figure 12:
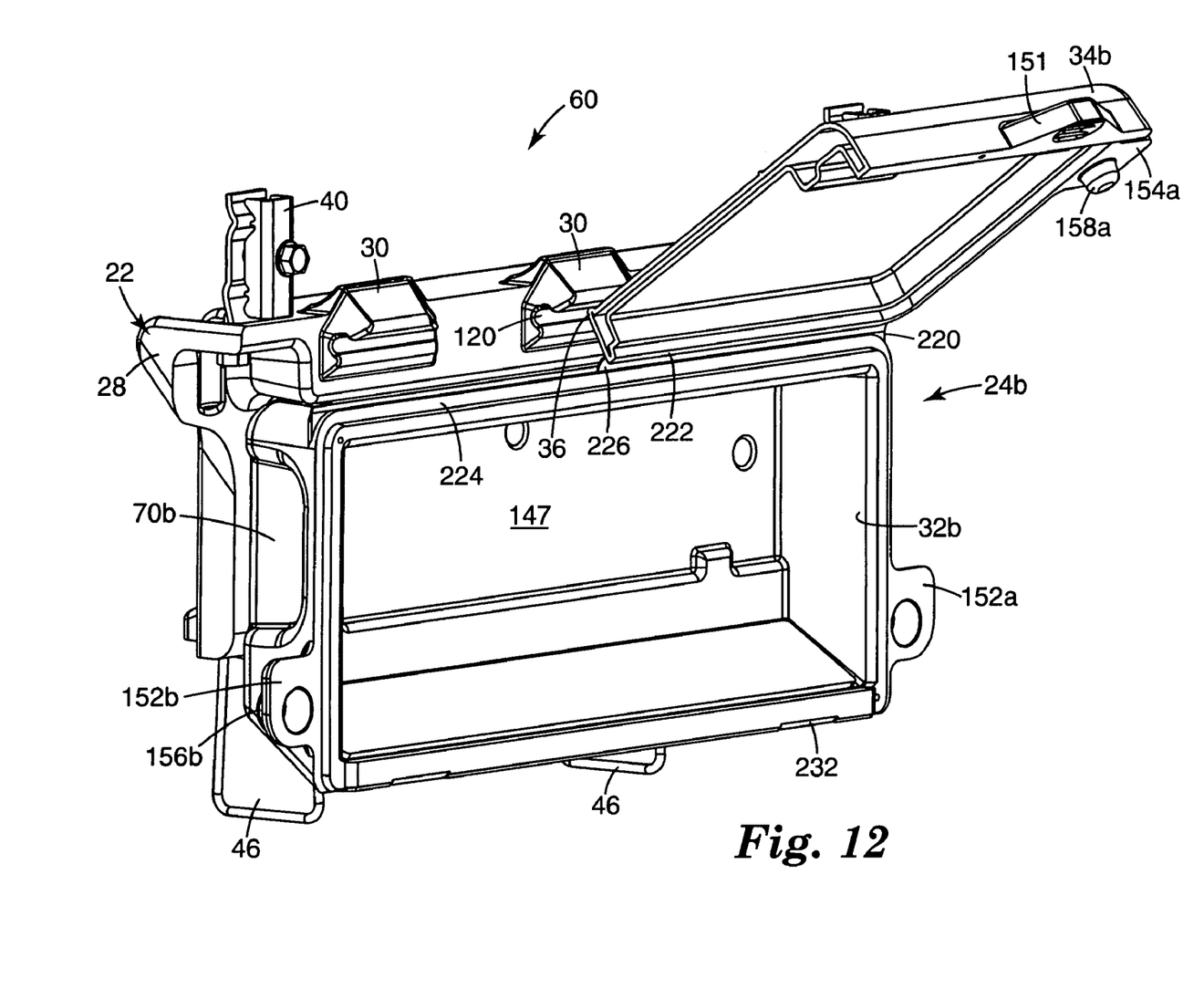
FIG. 12 illustrates a front perspective view of the aerial terminal shown in FIG. 1B including a cross-sectional view of a lid of the short terminal box according to one embodiment of the present invention.

Terminal box 24 is provided with clasps 151 that permit lid 34 to be grasped and moved to an open position, and maintain lid 34 in a closed position via coupling with clasp target 232 (FIG. 12). In any regard, when lid 34 is in the closed position, terminal box 24 provides a closure means that secures lid 34 to base 32, and in an alternate embodiment, terminal box 24 provides a locking mechanism between lid 34 and base 32. To this end, base 32 includes a first base tab 152a extending from end wall 68 and a second base tab 152b extending from end wall 68. Lid 34 includes a first lid tab 154a extending from a perimeter of lid 34 and a second lid tab 154b extending from a perimeter of lid 34, generally opposite lid tab 154a when lid 34 is in a closed position.

To facilitate a secure closure, base tab 152a is provided with a separable peg 156a, and base tab 152b is provided with a separable peg 156b. In a similar manner lid tab 154a is provided with a separable peg 158a, and lid tab 154b is provided with a separable peg 158b. In one embodiment, first separable pegs 156a and 156b are configured to securely and removably mate with second separable pegs 158a and 158b in securing lid 34 to base 32. In another embodiment, upon installation of terminal box 24, each of separable pegs 156a and 156b and separable pegs 158a and 158b can be selectively severed (for example by a technician using a utility knife) to form locking holes (not shown) in base tabs 152a, 152b and lid tabs 154a, 154b, thereby permitting the use of a padlock to securely lock lid 34 to base. 32 in the closed position.

When in the closed position, lid 34 is movably coupled to base 32 and a portion of lid tabs 154a, 154b is configured to be offset from a portion of base tabs 152a, 152b. In this manner, mutually opposing portions of lid tabs 154a, 154b and base tabs 152a, 152b are available for rotational disengagement of lid 34 from base 32. That is to say, in the closed position, lid tabs 154a, 154b are offset (for example, offset with regard to a vertical alignment) from base tabs 152a, 152b such that a portion of lid tabs 154a, 154b extend below base tabs 152a, 152b (and in a like manner a portion of base tabs 152a, 152b extend above lid tabs 154a, 154b) such that an opposing force applied to the exposed offset portions of lid tabs 154a, 154b and base tabs 152a, 152b will rotate and snap lid 34 apart from base 32.

Figure 7:
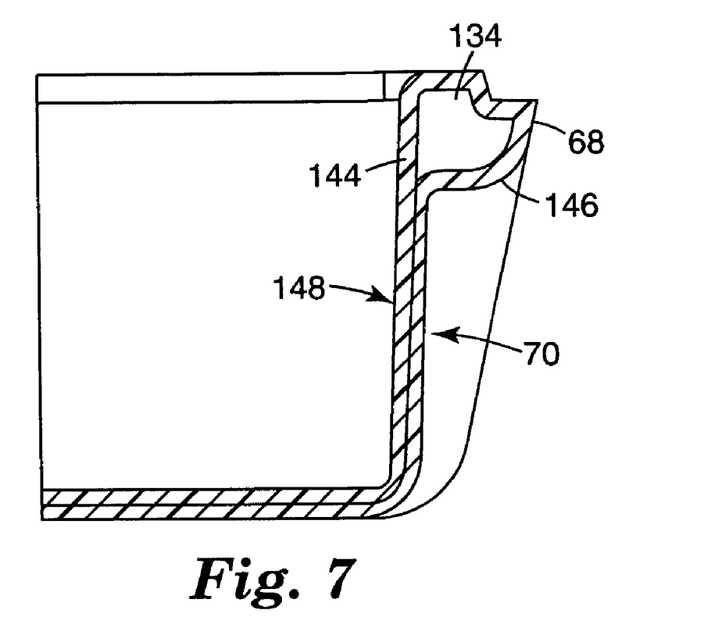
FIG. 7 illustrates a cross-sectional view of the terminal box taken along line 7—7 in FIG. 6, with the cross-section illustrating a telecommunication line port according to one embodiment of the present invention.

FIG. 7 illustrates a cross-sectional view of base 32 taken through end wall 68 in the region of cable port 70 along line 7—7 of FIG. 6. In one embodiment, terminal box 24 is formed as a double-walled structure having an interior wall 144 and an exterior wall 146. In one embodiment, interior and exterior walls 144, 146 are compressed together during the molding process to form a compressed double wall region 148. In FIG. 7, a portion of end wall 68 in the region of cable port 70 has been compressed into double wall region 148. During installation, a technician can access base 32 of terminal box 24 by perforating a compressed double wall region 148. In one embodiment, a perforation formed in compressed double wall region 148 is configured to receive a "port adaptor" (as described in U.S. patent application Ser. No. 10/916,332, filed Aug. 11, 2004, and incorporated herein by reference) that seals about telecommunication lines entering cable port 70.

With additional reference to FIG. 1B, FIG. 7 illustrates that at least a portion of at least one of the opposing end walls 68 defines a wall region 148 configured for formation of telecommunication line port (cable port) 70. In one embodiment, approximately 50% of one or both of opposing end walls 68 defines wall region 148. In another embodiment, substantially an entirety of one or both of opposing end walls 68 defines wall region 148 configured for formation of cable port 70. In an alternate embodiment, more than one portion of one or both of the opposing end walls 68 defines multiple regions substantially similar to compressed double wall region 148, each configured for formation of cable port 70.

Figure 8:
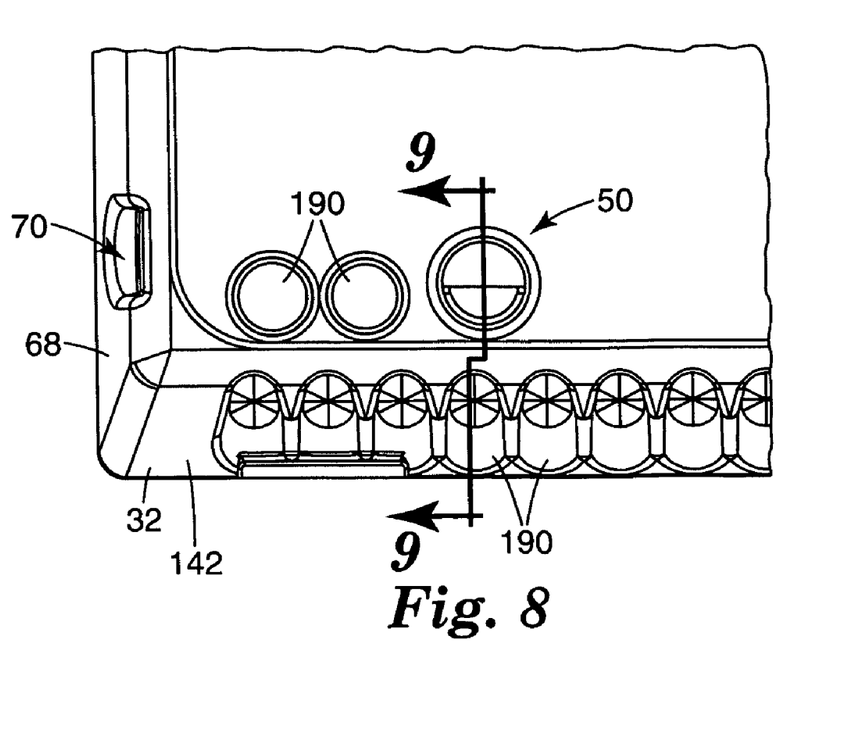
FIG. 8 illustrates an enlarged view of a terminal box vent shown in FIG. 1A.
Figure 9:
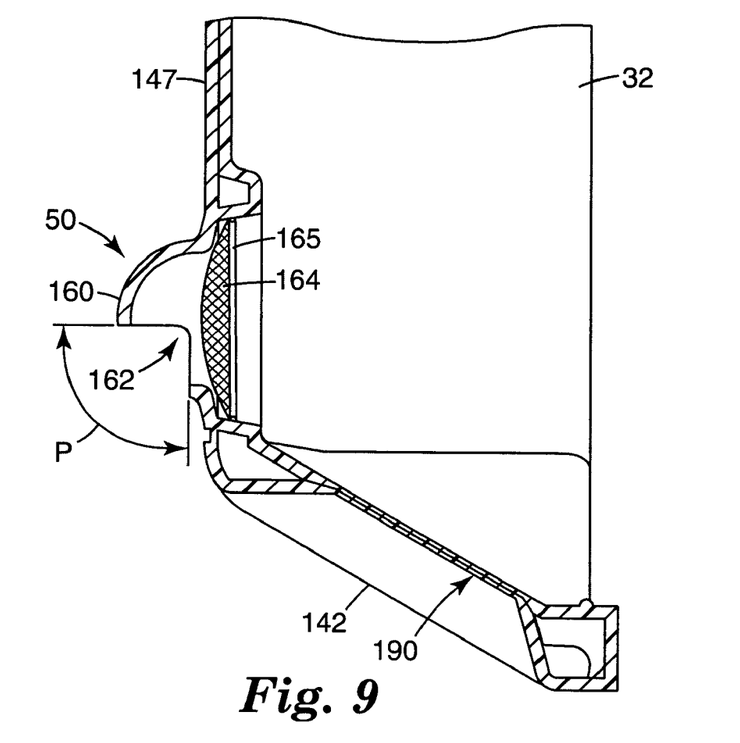
FIG. 9 illustrates a cross-sectional view of the vent taken along line 9—9 in FIG. 8, including a vent screen according to one embodiment of the present invention.
Figure 10:
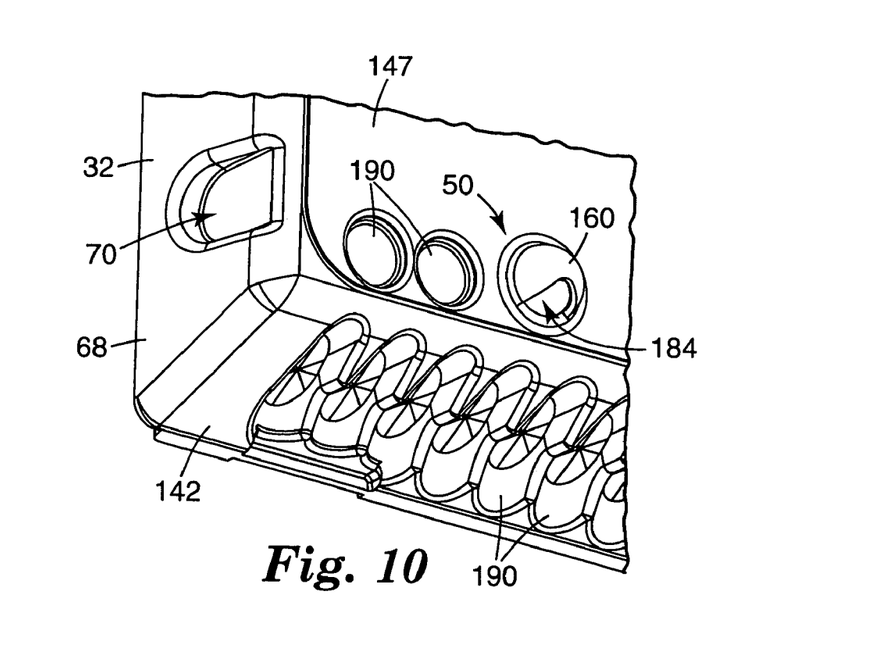
FIG. 10 illustrates an enlarged view of another embodiment of a terminal box vent according to the present invention.

With reference to FIGS. 8–10, in one embodiment, and as specifically illustrated in terminal box 24a of FIG. 1A, a terminal box 24 may comprise a breathable terminal box and include one or more vents 50. Vent 50 includes an approximately hemispherical protrusion 160 extending from base 32. In this regard, hemispherical protrusion 160 is configured to be opened to define an opening 162 into base 32. To this end, a portion P of hemispherical protrusion 160 has been selectively removed to provide opening 162 in vent 50. In one embodiment, portion P extends along hemispherical protrusion 160 in the range of 10 degrees to 170 degrees, preferably portion P extends between 45 degrees to 135 degrees, and more preferably portion P extends along hemispherical protrusion 160 for approximately 90 degrees, thus providing an opening 162 into base 32 for air circulation, yet repelling the entrance of rain into the terminal box. It will be appreciated that vent 50 in general and protrusion 160 in particular may have shapes other than the hemispherical shape illustrated. In other embodiments, protrusion 160 may have a conical shape, a pyramidal shape, frustoconical shape, frustopyramidal shape, or any other desired shape as is suitable.

As best seen in FIG. 9, in one embodiment vent 50 includes a porous screen 164 that impedes entrance of debris into breathable terminal box 24. Screen 164 is retained in position by annular ring 165. In one embodiment, porous screen 164 is a hydrophobic screen adapted to repel aqueous liquids. For example, one aspect of screen 164 includes a hydrophobic polymeric material formed to be porous to provide an air passageway through screen 164 and provide a resistance to the entrance of moisture through screen 164. Screen 164 can be made hydrophobic by the addition of polymer additives during processing, or by the application of hydrophobic coatings (for example, by dipping or spraying) to screen 164. In any regard, screen 164 prevents the entrance of debris into base 32 while permitting an exchange of air into base 32 through air opening 162. In an alternate embodiment, screen 164 is omitted from breathable terminal box 24.

FIG. 10 illustrates an enlarged view of another embodiment of a terminal box vent 50 showing that protrusion 160 can be trimmed to provide an opening of any desired shape and size, for example reduced-size opening 184. As a point of reference, opening 184 is substantially smaller than opening 162 shown in FIG. 9 (i.e., the surface segment removed is substantially less than portion P of FIG. 9). In this regard, it should be understood that vent 50 can be provided with protrusion 160 intact (i.e., air impermeable), such that a subsequent selective removal of a portion of protrusion 160 (for example, by a technician) defines an opening of a desired shape and size. For example, during installation a technician can selectively remove a portion of protrusion 160 selected to achieve an appropriate size for air opening 162, 184 that meets the installation specification for the particular environment in which terminal box 24a (FIG. 1A) is installed.

Also seen in FIGS. 8–10, terminal box 24 is provided with a plurality of compressed double wall regions 190 on bottom wall 142 and back wall 147 for additional access points into terminal box 24. Compressed double wall regions 190 may be used, for example, for drop lines exiting terminal box 24 or ground wires entering terminal box 24. As described above with respect to compressed double wall regions 148, a technician can access the interior of terminal box 24 by perforating a compressed double wall region 190 with a tool.

Figure 11:
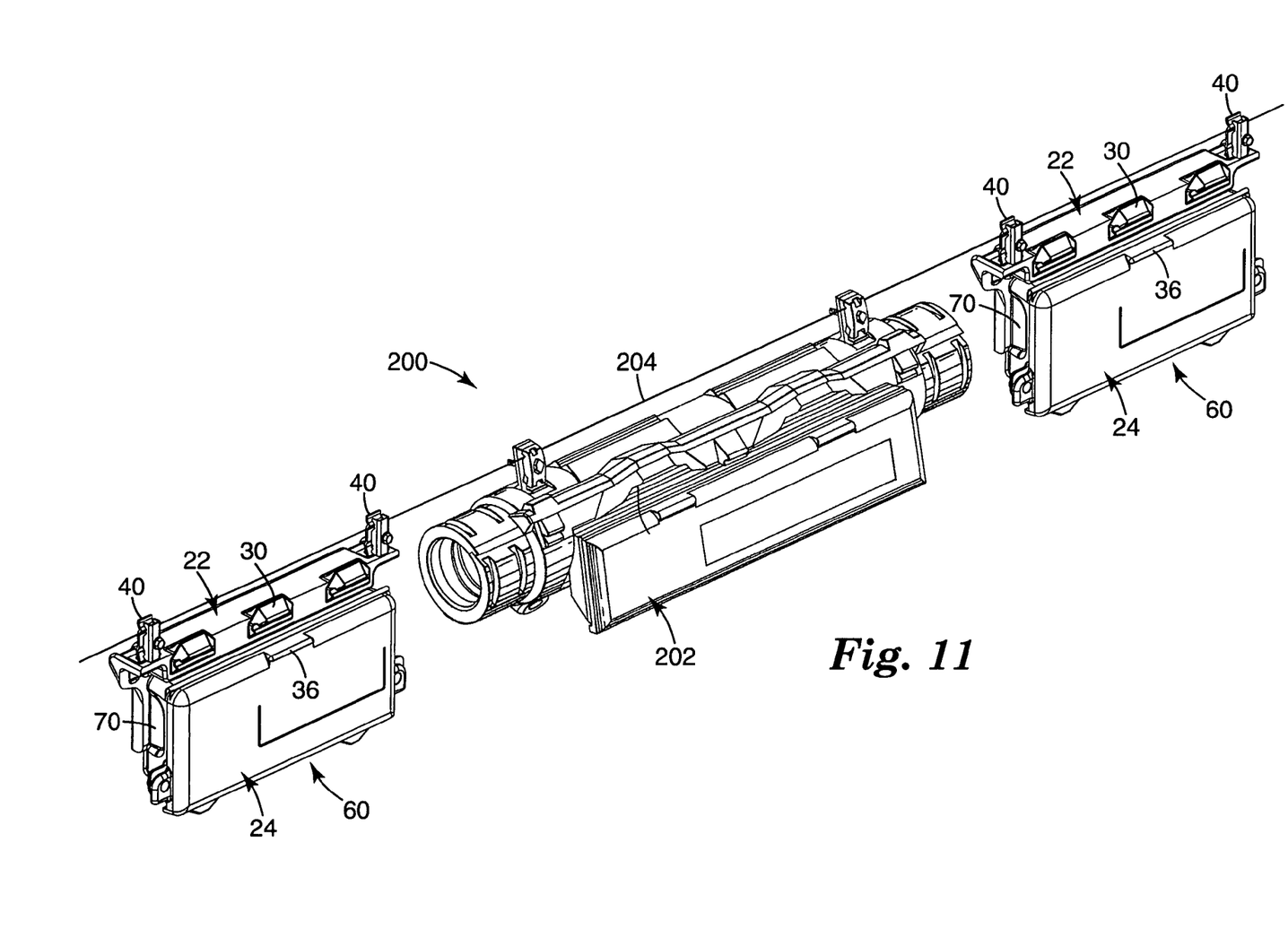
FIG. 11 illustrates an aerial terminal system including a splice closure and two aerial terminals according to one embodiment of the present invention.

FIG. 11 illustrates a perspective view of an aerial terminal system 200 useful with telecommunication lines according to one embodiment of the present invention. Aerial terminal system 200 includes a splice closure 202 coupled to a strand 204, and a pair of aerial terminals 60 disposed adjacent to splice closure 202. It will be understood that the use of aerial terminals 60 in FIG. 11 is illustrative only, and representative of any of the various aerial terminals described herein. Aerial terminals 60 are disposed adjacent to splice closure 202 such that telecommunication lines (not shown) entering splice closure 202 can be selectively spliced and directed to terminal boxes 24 in servicing the telecommunication lines.

To this end, each aerial terminal 60 includes a hanger 22 coupled to strand 204 via hanger brackets 40 and a terminal box 24 coupled to hanger 22. In this regard, terminal boxes 24 each define at least one telecommunication line port 70 (i.e., a cable port) defined in an end of terminal box 24 for reception of the telecommunication lines. In particular, hanger 22 supports and maintains terminal box 24 adjacent to splice closure 202 such that panels 26 enable direct, unobstructed access to telecommunication line ports 70. Although two aerial terminals 60 are shown in FIG. 12, it is to be appreciated that a single aerial terminal 60 could be disposed adjacent to splice closure 202. Alternately, although FIG. 12 illustrates an aerial terminal 60 on either side of splice closure 202, a plurality of aerial terminals 60 could be disposed on one or both sides of splice closure 202.

In use, aerial terminal 60 is employed to enclose telecommunication lines of a telecommunication cable (not shown) at points where the lines are "spliced into" for distribution of a signal to one or more locations. For example, one aspect of the invention provides a spliced telecommunication cable maintained within splice closure 202, with branches of telecommunication lines extending from splice closure 202 to aerial terminal 60 for subsequent routing to a network. It should be noted that the phrase "spliced into" as used herein is understood and intended to include any manner by which a signal in a telecommunication cable is routed away from the cable for distribution to one or more locations. In practice, the telecommunication cable may be spliced, split, tapped, coupled, and the like. For example, a telecommunication cable may contain a plurality of data lines. At a predetermined point, the cable is spliced into and signals from one or more of the plurality of data lines are routed from the main cable. This may occur, as an example, in a telephone network in which a primary or "trunk" telecommunication cable is routed though an area, and periodically one or more individual data lines are distributed to "branches" of the network. The branches may be further distributed until the network reaches individual homes, businesses, offices, and so on. The distributed lines are often referred to as drop lines or distribution lines.

In an example of a fiber optic telecommunication cable, the cable may contain a plurality of buffer tubes, with each buffer tube containing a plurality of individual optical fibers. At various points along the cable, it may be desired to branch off optical fibers of one or more buffer tubes, but not all of the optical fibers in the cable. The individual optical fibers of a buffer tube may be spliced directly to a corresponding drop line, or the individual optical fibers may be split, such as by using a splitter or coupler, so that the signals in a single fiber are distributed to more than one drop line. At this point, it should be noted that the aerial terminal described herein may be used with telecommunication cables in general, including electrically conductive (i.e., copper) cables, twisted pair conductors, coaxial cables, fiber optic cables, and combinations thereof, such as coaxial cables and fiber optic cables in the same terminal. Each type of telecommunication cable has corresponding devices and methods for routing a signal away from the cable to a drop line, and each of those devices and methods are understood and intended to be included in references to "splices" and "splicing into."

With the above in mind, FIG. 12 illustrates a front perspective view of aerial terminal 60 shown in FIG. 1B "ready for use" and including a cross-sectional view of lid 34b of short terminal box 24b according to one embodiment of the present invention. Back wall 147 of terminal box 24b is joined to hanger 22 by any suitable means of attachment. If terminal box 24b and hanger 22 are formed as separate units, suitable means for coupling back wall 147 of terminal box 24b to hanger 22 include, for example, adhesive, rivets, machine screws, bolts, heat welding, sonic welding, and the like. In another embodiment, terminal box 24b and hanger 22 are formed as a unitary integral structure rather than as separate units.

Lid 34b opens along an edge/opening seam 220 defined along a periphery of terminal box 24b that includes mating ridges 222 and corresponding grooves 224 that form a labyrinth-type seal for restricting the ingress of dirt, water, bugs, and the like, into terminal box 24b. Generally, lid 34b is rotatably connected to base 32b along hinge 226. In one embodiment, hinge 226 is a compression-molded hinge. That is, hinge 226 is a living hinge formed integrally with base 32b and lid 34b. Preferably, terminal box 24b is molded from a suitably durable polymer material, such as an olefin (for example, polyethylene) that enables repeated cycling of lid 34b between the open and closed positions. In one embodiment, hinge 226 is integrally formed when base 32b and lid 34b are molded. To this end, terminal box 24b may be formed of any conventional technique, including, for example, molding by blow molding, injection molding, and the like.

In certain environments, lid 34b is robustly secured to base 32b. For example, lid tab 154a includes separable peg 158a that couples with base tab 152a to secure lid 34b in the closed position. In one embodiment, separable peg 158a "locks" with an opposing base tab 152a and a separable peg (not visible, but substantially similar to separable peg 156b provided on base tab 152b) to secure lid 34b to base 32b.

After "unlocking" separable peg 158a, or otherwise unlocking lid 34b, access to the terminal box 24b is facilitated by rotating and separating lid 34b from base 32b, and subsequently securing lid 34b in the open position by coupling latch 36 into latch recess 120. In particular, terminal box 24b is oriented relative to hanger 22 such that when lid 34b is opened, a substantially unobstructed view is provided into the base 32b. This is accomplished by a selective positioning of hinge 226 relative to the location of hanger 22, and more specifically, by a selective positioning of hinge 226 relative to latch receptors 30.

During a servicing operation, lid 34b is rotated about hinge 226 into an open position and secured in the open position by coupling latch 36 into latch recess 120. In this regard, latch 36 and latch recess 120 combine to form a "hold-open" latch that provides a servicing technician access to an interior of base 32b (and to cable port 70b) for splicing and segregating telecommunications lines (not shown). In one embodiment lid 34b defines one latch 36 and hanger shoulder 28 defines three latch receptors 30, such that upon assembly the one latch 36 of lid 34b mates with a central one of the three latch receptors 30 (as illustrated in FIG. 12) to hold the lid in the open position. In another embodiment, a lid includes two latches and hanger shoulder defines three latch receptors, such that upon assembly two latches of the lid mate with an outermost two of the latch receptors to hold the lid in the open position. To this end, the material forming hanger 22 and terminal box 24b is sufficiently flexible, resilient, and durable to permit latch 36 to repeatably engage with (i.e., engage with and separate from) latch recess 120. In addition, lid 34b and base 32b include a respective cooperating clasp 151 and clasp target 232 that permit lid 34b to "snap" into a closed position.

An aerial terminal has been described that is useful with telecommunication lines and other cable terminals that is strong, lightweight, easy to access, and addresses the particular demands of fiber optic cables while being compatible with electrically conductive telecommunication cables. Various embodiments of an aerial terminal have been described that include one hanger defining a panel and a shoulder extending from the panel, and a terminal box including a base and lid, where the terminal box is coupled to the panel of the hanger. In addition, a hold-open latch has been described that permits the lid of the terminal box to be opened and held in an open position against a latch receptor of the hanger. The above-described hold-open latch permits convenient and easy access into the terminal box. Various terminal boxes have been described that are breathable, including bases that are provided with vents. The vents are provided with and without screens. In addition, the above-described hanger supports and maintains the terminal box along a suspended strand, and facilitates direct access to a single wall telecommunication line port defined in an end of the terminal box. During use, the bracket mounting area of the hanger provides a compressed double wall area that anchors bracket hangers (for coupling to the suspended strand) and prevents rotation of the hanger bracket relative to the hanger.

In addition, although universal hanger 22 has been described with specific reference to supporting a terminal box 24, universal hanger 22 may be utilized to support or suspend any variety of aerial telecommunications devices that are hung or suspended from a strand 204. For example, an aerial telecommunications device can include a closure, splice closure, terminal, or combinations thereof.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A universal aerial hanger for supporting an aerial telecommunications device used with telecommunication lines, the universal aerial hanger comprising:
    a panel including a mounting surface for attachment to an aerial telecommunications device and an exterior surface opposite the mounting surface;
    a shoulder extending from the panel toward the mounting surface, the shoulder including a plurality of latch receptors and at least one reinforced bracket mounting area; and
    at least one arm extending from the exterior surface and configured to receive strain relief guide loops for drop lines exiting the aerial telecommunications device.

2. The universal aerial hanger of claim 1, wherein at least one of said latch receptors is disposed between a pair of said reinforced bracket mounting areas.

3. The universal aerial hanger of claim 1, wherein the shoulder defines a top surface opposite a bottom surface and a face extending between the top and the bottom surfaces, the bottom surface adjacent to the mounting surface of the panel.

4. The universal aerial hanger of claim 3, wherein the plurality of latch receptors extends from at least one of the shoulder top surface and the shoulder face.

5. The universal aerial hanger of claim 1, wherein the aerial telecommunications device is at least one of a terminal box, a closure, and a splice closure.

6. A universal aerial hanger for supporting an aerial telecommunications device used with telecommunication lines, the universal aerial hanger comprising:
    a panel including a mounting surface for attachment to an aerial telecommunications device and an exterior surface opposite the mounting surface;
    a shoulder extending from the panel toward the mounting surface, the shoulder including a plurality of latch receptors and at least one reinforced bracket mounting area; and
    at least one arm extending from the exterior surface and configured to receive strain relief guide loops for drop lines exiting the aerial telecommunications device;
    wherein each of the panel and the shoulder comprise a molded double wall structure defining a substantially hollow core.

7. The universal aerial hanger of claim 6, wherein the panel includes at least one reinforced region where a wall of the exterior surface is compressed to contact a wall of the mounting surface to form a compressed double wall region.

8. The universal aerial hanger of claim 6, wherein the at least one reinforced bracket mounting area comprises a compressed double wall region formed in the shoulder.

9. A universal aerial hanger for supporting an aerial telecommunications device used with telecommunication lines, the universal aerial hanger comprising:
    a panel including a mounting surface for attachment to an aerial telecommunications device and an exterior surface opposite the mounting surface;
    a shoulder extending from the panel toward the mounting surface, the shoulder including a plurality of latch receptors and at least one reinforced bracket mounting area; and
    at least one arm extending from the exterior surface and configured to receive strain relief guide loops for drop lines exiting the aerial telecommunications device;
    wherein the panel defines opposing ends along a longitudinal direction, and further wherein the shoulder extends longitudinally beyond the opposing ends of the panel.

* * * * *